US005473350A

United States Patent [19]

Mader et al.

[11] Patent Number: 5,473,350

[45] Date of Patent: Dec. 5, 1995

[54] SYSTEM AND METHOD FOR MAINTAINING INK CONCENTRATION IN A SYSTEM

[75] Inventors: Rodney G. Mader, Dayton; James C. Ralston, Spring Valley, both of Ohio

[73] Assignee: Scitex Digital Printing, Inc., Dayton, Ohio

[21] Appl. No.: 926,609

[22] Filed: Aug. 6, 1992

[51] Int. Cl.[6] .......... G01D 15/18

[52] U.S. Cl. .......... 347/7; 347/86

[58] Field of Search .......... 347/5–7, 84–86, 347/87

[56] References Cited

U.S. PATENT DOCUMENTS

| | | | |
|---|---|---|---|
| 4,121,222 | 10/1978 | Diebold et al. | 347/7 |
| 4,183,031 | 1/1980 | Kyser et al. | 347/86 |
| 4,337,468 | 6/1982 | Mizuno | 347/7 |
| 4,342,042 | 7/1982 | Cruz-Uribe et al. | 347/85 |
| 4,403,227 | 9/1983 | Bertschy et al. | 347/85 |
| 4,432,005 | 2/1984 | Duffield et al. | 347/86 |
| 4,533,925 | 8/1985 | Tsao et al. | 347/74 |
| 4,660,057 | 4/1987 | Watanabe et al. | 347/17 |
| 4,677,448 | 6/1987 | Mizusawa et al. | 347/85 |
| 4,680,696 | 7/1987 | Ebinuma et al. | 347/85 |

*Primary Examiner*—A. T. Grimley

*Assistant Examiner*—T. A. Dang

*Attorney, Agent, or Firm*—Barbara Joan Haushalter

[57] ABSTRACT

Ink concentration in a system is maintained regardless of the duty cycle under which the system is operating. In an ink jet system, a print head receives ink from the main ink supply and forms continuous drops. The drops needed for printing to form the desired image are selected from the continuously formed drops. Based on the selection, a count signal is produced indicative of the number of drops printed. An ink level sensor in the main ink reservoir generates a low ink level signal when ink in the reservoir reaches a predetermined low level, the difference between a normal level and the low level corresponding to a predetermined cycle volume. A fluid connection selectively allows flow into the main ink reservoir from either the external supply of ink or the external supply of ink replenisher. Finally, a controller responsive to the ink level sensor and the count signal, is arranged to enable flow of fluid from one of the external reservoirs to the main ink reservoir in response to the low ink level signal, and to cease allowing flow in response to the normal ink level signal. The controller is arranged to selectively allow the flow of ink and replenisher based on drop count history and the predetermined cycle volume of ink, and in response to the low ink level signal, so that a substantially constant concentration of ink is maintained in the main ink reservoir in spite of evaporation of ink solvent.

16 Claims, 2 Drawing Sheets

SYSTEM AND METHOD FOR MAINTAINING INK CONCENTRATION IN A SYSTEM

TECHNICAL FIELD

The present invention relates to continuous ink jet printers and, more particularly, to an innovative system and method for maintaining the concentration of the ink in a system regardless of the duty cycle under which it is operating.

BACKGROUND ART

Ink jet printing systems are known in which a print head defines one or more rows of orifices which receive an electrically conductive recording fluid, such as for instance a water base ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

In a continuous ink jet fluid system, the ink used, which includes a carrier fluid, such as water or a solvent, and colorant, is continuously recirculated through the system under vacuum and mixed with air. Evaporation of the carrier fluid due to the air-ink interaction increases the colorant concentration, such as dye or pigment, of the ink. Proper colorant concentration is essential to the operation of an ink jet print head. The measurement of colorant concentration is used to determine the amount of replenisher needed to mix with the ink to compensate for the carrier fluid lost due to evaporation. When printing rates are high, the amount of colorant and carrier fluid removed from the system are typically approximately equal and the ink concentration is maintained, thus, only ink is added to the system.

Alternatively, when little or no printing is being done, the system is in an idle condition and the evaporation rate of the carrier fluid is typically higher than the amount of colorant removed during printing. In this instance, then, the colorant concentration level increases. A replenishment fluid is needed to bring the ink concentration level down to the proper mixture since high ink concentration affects properties of the ink which are critical to the functions of an ink jet print head. As would be obvious to one skilled in the art, affecting ink properties such as viscosity is detrimental, since the energy required to stimulate filaments is determined partially by the viscosity of the fluid.

It is desirable to maintain the ink concentration of a system at a level within narrow limits of fresh ink. This is accomplished by adding replenishment fluid to the system to compensate for ink vehicle fluid lost by evaporation. Previous systems used a direct measure of the colorant concentration in the ink for this purpose, typically employing one of two different measuring techniques. One concentration monitoring system uses a viscosity measurement to assess ink concentration. The second, and more successful method uses an optical density measurement. Both of these methods require the use of complex and expensive hardware, and necessitate tedious calibration. Another known system for reconstitution is described in U.S. Pat. No. 4,121,222. The system disclosed in the '222 patent uses a printed drop count to determine when fluid should be added. That system also uses a balance scale to determine when replenishment fluid is needed. However, this reconstitution system requires a weight balance for solvent make-up. Such devices are expensive, particularly when modified to be suitable for use in an industrial environment.

It is seen then that there is a need for a system and method for maintaining ink concentration in a system regardless of the duty cycle under which it is operating, and without the use of a complicated and expensive apparatus for monitoring ink concentration directly.

SUMMARY OF THE INVENTION

This need is met by the system and method of the present invention wherein a general purpose is to maintain the ink concentration of a system at a level within narrow limits of fresh ink. This is accomplished by adding replenishment fluid to the system to compensate for ink vehicle fluid lost by evaporation.

In accordance with one aspect of the present invention, ink concentration in a system is maintained regardless of the duty cycle under which the system is operating. In an ink jet system, a print head receives ink from the main ink supply and forms continuous drops. The drops needed for printing to form the desired image are selected from the continuously formed drops. Based on the selection, a count signal is produced indicative of the number of drops printed. An ink level sensor in the main ink reservoir generates a low ink level signal when ink in the reservoir reaches a predetermined low level, the difference between a normal level and the low level corresponding to a predetermined cycle volume. A fluid connection selectively allows flow into the main ink reservoir from either the external supply of ink or the external supply of ink replenisher. Finally, a control means responsive to the ink level sensor and the count signal, is arranged to enable flow of fluid from one of the external reservoirs to the main ink reservoir in response to the low ink level signal, and to cease allowing flow in response to the normal ink level signal. The control means is arranged to selectively allow the flow of ink and replenisher based on drop count history and the predetermined cycle volume of ink, and in response to the low ink level signal, so that a substantially constant concentration of ink is maintained in the main ink reservoir in spite of evaporation of ink solvent.

Accordingly, it is an advantage of the present invention that it maintains the concentration of ink in a system, regardless of the duty cycle under which the system is operating. Other objects and advantages of the invention will be apparent from the following description, the accompanying drawing and the appended claims.

DETAILED DESCRIPTION OF THE PREFERRED EMBODIMENTS

Figure 1:
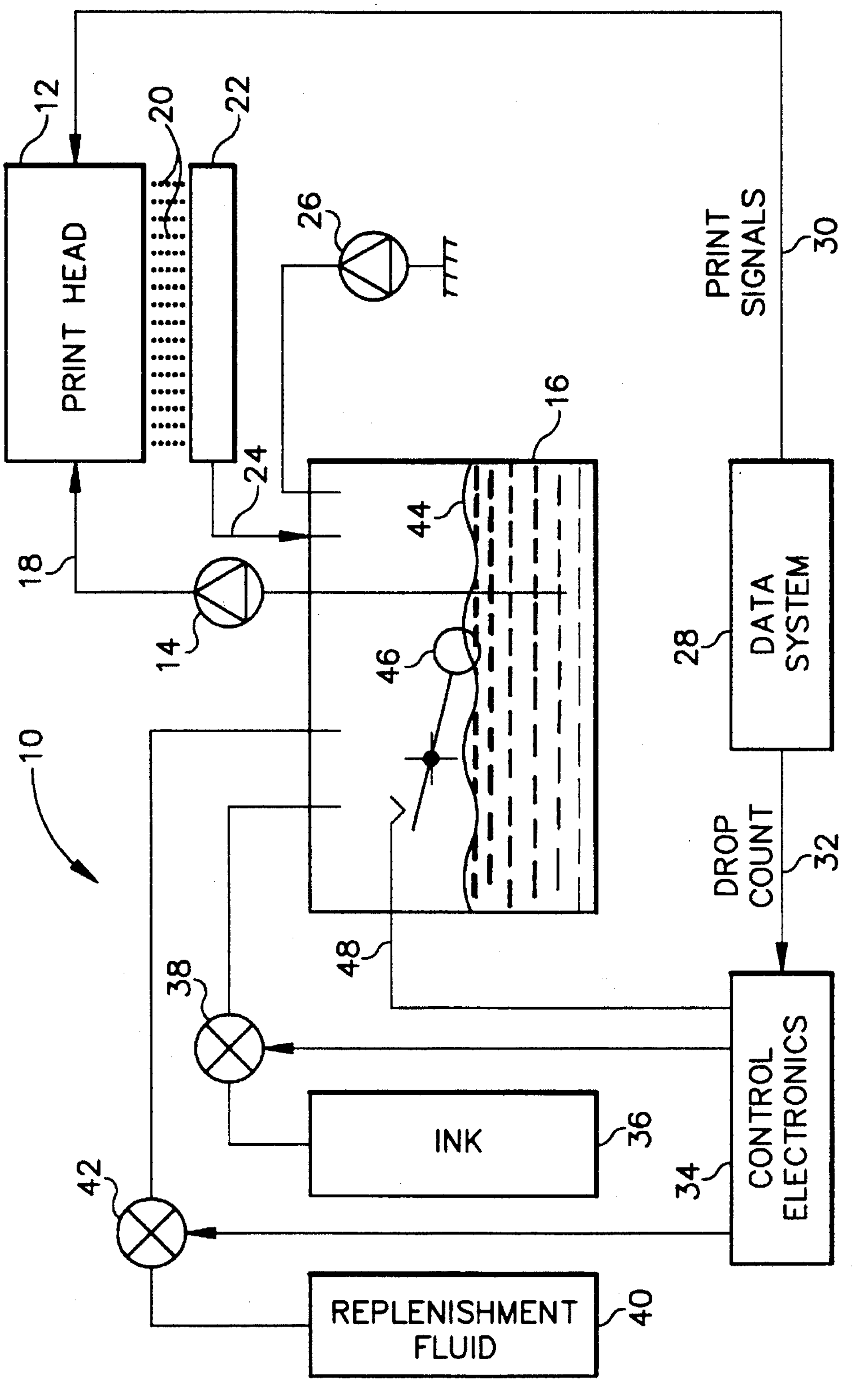
FIG. 1 is a diagrammatic representation of the fluid handling portion of a printing system embodying the present invention.

Referring to the drawings, FIG. 1 is a diagrammatic representation of one embodiment of the present invention. In FIG. 1, a fluid handling portion of a printing system, generally referred to by reference numeral 10, is shown. The system 10 includes a print head assembly 12 useful for non-contact imaging, arranged in the fluid system 10 to supply consistent ink for printing. Ink is supplied to the print head 12 by an ink pump 14 which draws its ink from a main internal reservoir 16 and supplies the ink to the print head 12 under pressure.

Continuing with FIG. 1, internal to the print head 12 is a plurality of orifices fluidically connected via fluid lines 18 to the pressurized flow of ink from the ink pump 14. The orifices have a closely controlled open area so that under a given pressure, a consistent flow of ink is obtained from each orifice. Each orifice in the plurality continuously creates uniform streams of drops of ink 20. Drops to be used for printing are given a different treatment from those not selected for printing. For example, the drops selected for printing are given an electrostatic charge which is different from the non print drops. In this case, the drops then pass through an electrostatic field which separates the print drops from the redundant drops. Of course, any technique which can slightly change the momentum of the drop, can be used to separate print drops from redundant drops.

Drops which are not used for imaging are deflected into a catcher 22. The catcher 22 is connected by fluid lines 24 to the main internal reservoir 16 which is maintained under a partial vacuum by a vacuum pump 26. Any suitable means can be utilized to create the necessary vacuum, such as an aspirator pump or a mechanical vacuum pump. The vacuum created by the vacuum pump 26 is effective in drawing the un-printed ink from the catcher 22 to the main internal reservoir 16. It will be clear to one skilled in the art that filters, restrictors, and other components can be used in the fluid system 10 described herein without departing from the spirit of the invention disclosed.

A key aspect of the imaging system 10 described in FIG. 1 is a data system 28 which supplies control signals to the print head 12 in the form of print signals along line 30. These print signals determine whether each of the drops generated by the plurality of orifices in the print head 12 is to be a printed drop or is to be caught by the catcher 22 and returned to the main internal reservoir 16. For example, in a binary continuous ink jet printer, a "1" signal might correspond to a drop to be printed, while a "0" signal might correspond to a drop to be caught and recirculated. The data system 28 must provide appropriate signals to the print head 12 to print the desired image. Another function of the data system 28 is to maintain a count of the number of drops printed, and to provide that count signal, N, along line 32 to control means 34.

The main internal reservoir 16 maintains an ink supply internal to the printer and is fluidically connected to an external supply of ink 36 via a valve 38 and an external supply of replenishment fluid 40 via a valve 42, wherein both valves 38 and 42 are controlled by the control means 34. Ink level, denoted as reference numeral 44, in the main internal reservoir 16 is controlled by a level sensing system, diagrammatically shown in FIG. 1 as a float switch 46. When the ink level 44 in the main internal reservoir 16 drops below a predetermined level, the level sensing switch 46 is closed, and a low ink level signal is generated along line 48 and detected by the control means 34. In response to the low ink level signal, the control means 34 opens either valve 38 or valve 42, making a fluidic connection from one of the external tanks 36 or 40 to the main internal reservoir 16. The vacuum in the main internal reservoir 16 draws fluid through the opened valve 38 or 42, from either the external ink tank 36 or the external replenishment tank 40. The opened valve remains open until the fluid in the main internal reservoir 16 raises to a level at which the level sensor switch 46 is again opened. The volume of fluid added in this process is called a cycle volume M. The cycle volume is determined by the hysteresis in the level sensor switch 46. Whether valve 38 or valve 42 is opened is determined by a control function, depicted in FIG. 2, which is responsive to the drop count signal N as well as to the history of previous fluid additions.

Figure 2:
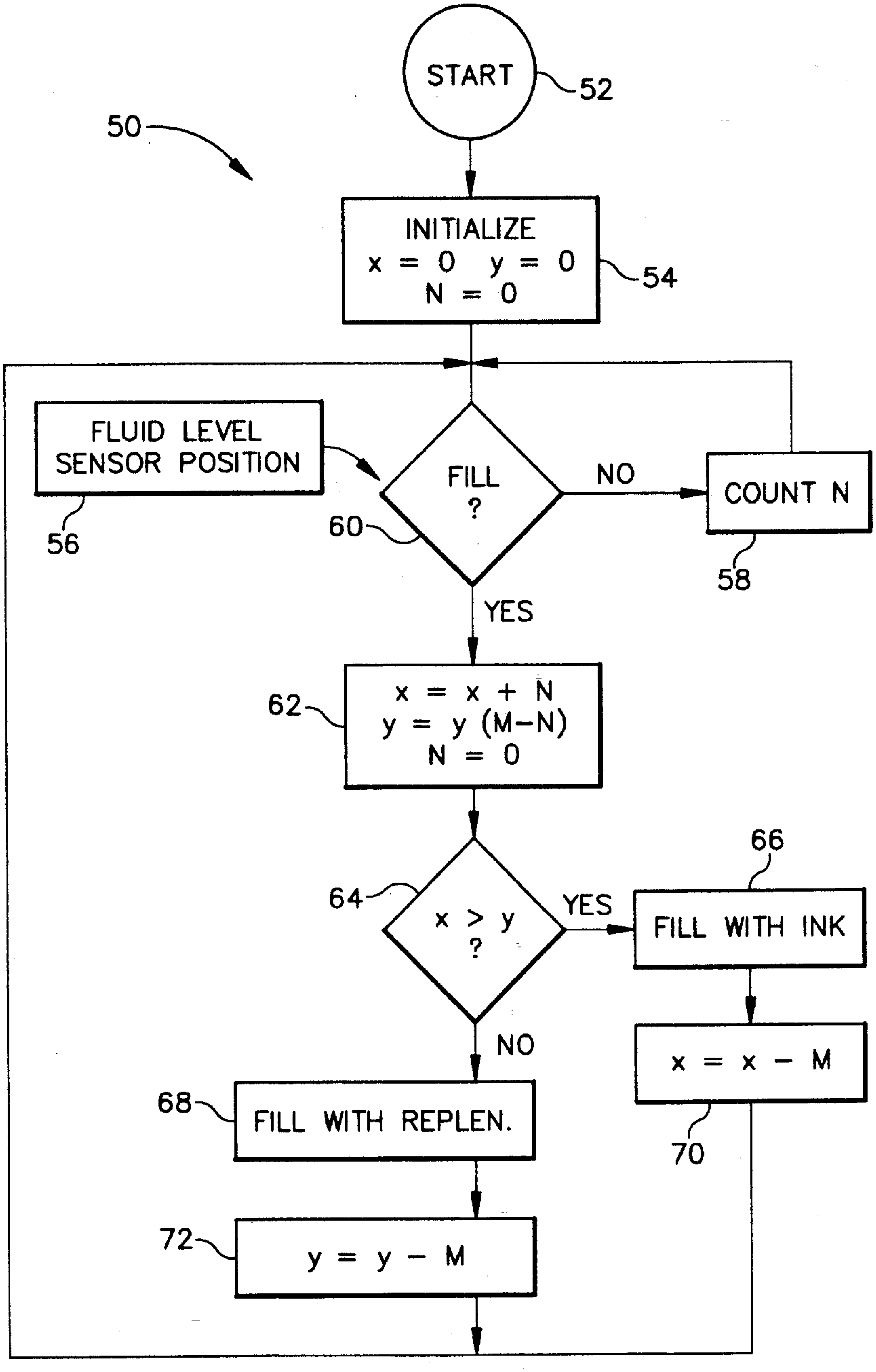
FIG. 2 is a flow diagram which describes a control function for controlling operation of a control means in an exemplary replenishment system.

Referring now to FIG. 2, there is illustrated a flow chart 50 of the control function which controls the operation of the control means 34 in FIG. 1. When the flow chart 50 starts at block 52, three values are initialized at block 54; an ink volume variable, x, a replenishment fluid volume variable, y, and the drop count, N. The ink volume variable, x, is a variable which monitors ink volume, and can be tabulated in appropriate units such as units of drop volume. The replenishment volume variable, y, is another variable which monitors replenishment fluid volume, and can be tabulated in appropriate units such as units of drop volume. The drop count, N, is a third variable which monitors the volume of ink printed, and can be tabulated in appropriate units such as units of drop volume.

As the system 10 operates, fluid is used by evaporation and by printing. Logic in the control means 34 of FIG. 1 constantly checks to see if the level sensing switch 46 is closed, as indicated by block 56, and constantly updates the drop count N as drops are printed, as indicated at block 58. The drop count N is maintained by the data system 28. When the logic of the control means 34 determines that the level sensing switch 46 is closed, a closed position is indicated at block 56. When the position of the level sensor 46 is closed, it is determined at decision block 60 that fluid must be added to the system 10. When the position of the fluid sensor is determined at block 56 to be open, then decision block 60 determines that fluid does not need to be added to the system 10, and the logic on the control means 34 continues its checking.

When fluid must be added to the system 10, as determined at decision block 60, the flow chart proceeds to block 62, where the variables x, y, and N, previously initialized at block 54, are utilized. At block 62, the drop count N is added to the ink volume variable x, and the difference between the cycle volume M and the drop count N is added to the volume variable y. This is done so that the total volume added to the sum of ink volume variable x and replenishment volume variable y is the cycle volume M. The program 50 then proceeds to decision block 64 where the logic of the control means 34 checks to see which of the two variables, x and y, is larger. When the ink volume variable x is larger than the replenishment volume variable y, then ink is added to the system 10 from the ink supply tank 36 to keep the fluid concentration in the main internal reservoir 16 near standard or acceptable level for fresh ink, as indicated by block 66. Conversely, when the replenishment volume variable y is larger than or equal to the ink volume variable x, then replenishment fluid is added to the system 10 from the replenishment tank 40 to keep the fluid concentration in the main internal reservoir 16 near the standard or acceptable level for fresh ink, as indicated by block 68.

When it is determined at decision block 64 that ink should be added to the main internal reservoir 16, then valve 38 in FIG. 1 is opened, allowing the flow of ink from the ink tank 36 into the main internal reservoir 16, until the level sensing switch 46 is opened. The ink volume variable x is then decremented by the cycle volume M at block 70, and the system 10 returns to the state where it constantly monitors the level sensing switch 46 to see if more fluid needs to be added to the system 10. Conversely, when it is determined at decision block 64 that replenishment fluid should be added to the main internal reservoir 16, then valve 42 in FIG. 1 is opened, allowing the flow of replenishment fluid from replenishment tank 40 into the main internal reservoir 16, until the level sensing switch 46 is opened. The replenishment volume variable y is then decremented by the cycle volume M at block 72, and the system returns to the state where it constantly monitors the level sensing switch 46 to see if more fluid needs to be added to the system 10.

The present invention provides a system and method for maintaining the concentration of ink in a system regardless of the duty cycle under which the system is operating. This is accomplished with a control means for selectively allowing the flow of ink and replenisher based on drop count history, the predetermined cycle volume of ink, and the low ink level signal. This maintains a substantially constant concentration of ink in the main ink reservoir, in spite of evaporation of ink solvent.

Industrial Applicability and Advantages

The present invention is useful in the field of ink jet printing, and has the advantage of maintaining ink concentration in a system without the use of a complicated and expensive apparatus for monitoring ink concentration directly. It is a further advantage of the present invention that it uses hardware already in the system and only adds an additional external replenishment fluid supply, an additional valve and software control for the valve. The system is more cost effective and simpler than existing systems.

The invention has been described in detail with particular reference to certain preferred embodiments thereof, but it will be understood that modifications and variations can be effected within the spirit and scope of the invention.

We claim:

1. In an ink jet printer having a main ink reservoir as the internal source of ink which is fluidically connected to two external supplies, one of ink and one of ink replenisher, and in which print drops are continuously created and certain of the drops are selected for printing while the drops not selected for printing are returned to the main ink reservoir, the system comprising:

(a) a print head connected to receive ink from the main ink reservoir and having means to form drops of a predetermined small range of drop volumes;

(b) selection means for selecting which of the continuously formed drops are needed for printing to form the desired image;

(c) drop count means responsive to said selection means for producing a count signal indicative of a number of drops printed;

(d) sensing means in the main ink reservoir utilizing hysteresis in a float switch means, the normal level being a point at which the switch assumes a first state, and the low level being a point at which the switch assumes a second state, the sensing means being used to generate a signal responsive to a predetermined low ink level in the reservoir, the difference between an accepted ink level and the low ink level corresponding to a predetermined cycle volume; and (e) control means responsive to the sensing means and the drop count means, the control means including, (a) means for initializing an ink volume variable, a replenishment fluid volume variable, and the count signal, (b) means associated with the sensing means for determining the float switch state, and (c) means associated with the drop count means for constantly updating the count signal as drops are printed, to enable flow of fluid from one of the external reservoirs to the main ink reservoir in response to the low ink level signal means and to cease allowing flow in response to the acceptable ink level signal means.

2. The invention as claimed in claim 1 further comprising fluid connection means responsive to the sensing means for selectively allowing flow into the main ink reservoir from the external supply of ink and the external supply of ink replenisher.

3. The invention as claimed in claim 1 wherein the control means selectively allows the flow of ink and ink replenisher based on drop count history, the predetermined cycle volume of ink, and the low ink level signal, to maintain a substantially constant concentration of ink in the main ink reservoir.

4. (Amended) The invention as claimed in claim 1 further comprising means for adding fluid to the main reservoir when the float switch means is in a closed position.

5. The invention as claimed in claim 4 wherein the means for adding fluid further comprises:

(a) means for adding a count signal to the ink volume variable;

(b) means for determining a difference between the cycle volume and the count signal and generating a difference signal in response thereto; and (c) means for adding the difference signal to the replenishment fluid volume variable, wherein a total volume added to the sum of ink volume variable and the replenishment fluid volume variable is equal to the cycle volume.

6. The invention as claimed in claim 1 wherein ink is added to the main ink reservoir when the ink volume variable is larger than the replenishment fluid volume variable.

7. The invention as claimed in claim 1 wherein ink replenisher is added to the main ink reservoir when the replenishment fluid volume variable is at least equal to the ink volume variable.

8. The invention as claimed in claim 1 wherein the selection means and the drop count means comprise a data system.

9. In an ink jet printer having a main ink reservoir as the internal source of ink which is fluidically connected to two external supplies, one of ink and one of ink replenisher, and in which print drops are continuously created and certain of the drops are selected for printing while the drops not selected for printing are returned to the main ink reservoir, the method comprising the steps of:

(a) connecting a print head to receive ink from the main ink reservoir and having means to form drops of a pre-determined small range of drop volumes;

(b) using a selection means for selecting which of the continuously formed drops are needed for printing to form the desired image;

(c) using a drop count means responsive to said selection means for producing a count signal indicative of a number of drops printed;

(d) positioning a sensing means in the main ink reservoir, the sensing means utilizing hysteresis in a float switch means, the normal level being a point at which the switch assumes a first state, and the low level being a point at which the switch assumes a second state, the sensing means being used to generate a signal responsive to a predetermined low ink level in the reservoir, the difference between an accepted ink level and the low ink level corresponding to a predetermined cycle volume; and (e) using a control means responsive to the sensing means and the drop count means, the step of using a control means including the steps of a. initializing an ink volume variable, a replenishment fluid volume variable, and the count signal, b. determining the float switch state, and c. constantly updating the count signal as drops are printed, to enable flow of fluid from one of the external reservoirs to the main ink reservoir in response to the low ink level signal means and to cease allowing flow in response to the acceptable ink level signal means.

10. The invention as claimed in claim 9 further comprising the step of using fluid connection means responsive to the sensing means for selectively allowing flow into the main ink reservoir from the external supply of ink and the external supply of ink replenisher.

11. The invention as claimed in claim 9 wherein the control means selectively allows the flow of ink and ink replenisher based on drop count history, the predetermined cycle volume of ink, and the low ink level signal, to maintain a substantially constant concentration of ink in the main ink reservoir.

12. The invention as claimed in claim 9 further comprising the step of adding fluid to the main reservoir when the float switch means is in a closed position.

13. The invention as claimed in claim 12 wherein the step of adding fluid further comprises the steps of:

(a) adding a count signal to the ink volume variable;

(b) determining a difference between the cycle volume and the count signal and generating a difference signal in response thereto; and (c) adding the difference signal to the replenishment fluid volume variable, wherein a total volume added to the sum of ink volume variable and the replenishment fluid volume variable is equal to the cycle volume.

14. The invention as claimed in claim 9 wherein ink is added to the main ink reservoir when the ink volume variable is larger than the replenishment fluid volume variable.

15. The invention as claimed in claim 9 wherein ink replenisher is added to the main ink reservoir when the replenishment fluid volume variable is at least equal to the ink volume variable.

16. The invention as claimed in claim 9 wherein the selection means and the drop count means comprise a data system.

* * * * *